United States Patent
Luyster et al.

(10) Patent No.: US 10,280,355 B2
(45) Date of Patent: *May 7, 2019

(54) RESERVOIR WELLBORE FLUID

(71) Applicant: M-I, L.L.C., Houston, TX (US)

(72) Inventors: Mark Luyster, Houston, TX (US); Leigh Gray, Houston, TX (US); Sashikumar Mettath, Houston, TX (US); Steven Young, Cypress, TX (US); Emanuel Stamatakis, Houston, TX (US)

(73) Assignee: M-I L.L.C., Houston, TX (US)

(*) Notice: Subject to any disclaimer, the term of this patent is extended or adjusted under 35 U.S.C. 154(b) by 516 days.

This patent is subject to a terminal disclaimer.

(21) Appl. No.: 14/414,079

(22) PCT Filed: Jul. 9, 2013

(86) PCT No.: PCT/US2013/049656
§ 371 (c)(1),
(2) Date: Jan. 9, 2015

(87) PCT Pub. No.: WO2014/011592
PCT Pub. Date: Jan. 16, 2014

(65) Prior Publication Data
US 2015/0159074 A1    Jun. 11, 2015

Related U.S. Application Data

(60) Provisional application No. 61/669,479, filed on Jul. 9, 2012.

(51) Int. Cl.

| | |
|---|---|
| *C09K 8/32* | (2006.01) |
| *C09K 8/03* | (2006.01) |
| *C09K 8/34* | (2006.01) |
| *C09K 8/52* | (2006.01) |
| *C09K 8/502* | (2006.01) |
| *C09K 8/64* | (2006.01) |
| *C09K 8/82* | (2006.01) |
| *E21B 19/22* | (2006.01) |
| *E21B 21/08* | (2006.01) |
| *E21B 21/00* | (2006.01) |

(52) U.S. Cl.
CPC ............... *C09K 8/32* (2013.01); *C09K 8/03* (2013.01); *C09K 8/34* (2013.01); *C09K 8/502* (2013.01); *C09K 8/52* (2013.01); *C09K 8/64* (2013.01); *C09K 8/82* (2013.01); *E21B 19/22* (2013.01); *E21B 21/08* (2013.01); *E21B 2021/006* (2013.01)

(58) Field of Classification Search
CPC ... C09K 8/03; C09K 8/34; C09K 8/52; C09K 8/82; C09K 8/32; C09K 8/502; C09K 8/64; E21B 19/22; E21B 2021/006; E21B 21/08

See application file for complete search history.

(56) References Cited

U.S. PATENT DOCUMENTS

| | | | |
|---|---|---|---|
| 4,231,428 A * | 11/1980 | Needham | C09K 8/805 166/280.2 |
| 4,986,355 A * | 1/1991 | Casad | C09K 8/5086 166/281 |
| 5,358,050 A | 10/1994 | Schmidt | |
| 6,586,372 B1 | 7/2003 | Bradbury et al. | |
| 7,033,975 B2 | 4/2006 | Baran, Jr. et al. | |
| 7,176,165 B2 | 2/2007 | Massam et al. | |
| 7,921,911 B2 | 4/2011 | Fuller et al. | |
| 8,193,124 B2 | 6/2012 | Mettath et al. | |
| 2003/0220204 A1 | 11/2003 | Baran, Jr. | |
| 2004/0122111 A1 | 6/2004 | Varadaraj et al. | |
| 2004/0127366 A1 | 7/2004 | Bradbury et al. | |
| 2004/0226746 A1* | 11/2004 | Schmidt | C09K 8/03 175/17 |
| 2005/0101493 A1 | 5/2005 | Bradbury et al. | |
| 2005/0131107 A1 | 6/2005 | Okel et al. | |
| 2005/0176852 A1 | 8/2005 | Okel et al. | |
| 2005/0263037 A1* | 12/2005 | Chatterji | C04B 20/1051 106/677 |
| 2005/0277553 A1 | 12/2005 | Massam et al. | |
| 2006/0073987 A1* | 4/2006 | Mueller | C09K 8/36 507/136 |

(Continued)

FOREIGN PATENT DOCUMENTS

| | | |
|---|---|---|
| CN | 102585785 A | 7/2012 |
| WO | WO 2009094425 A2 * | 7/2009 ............... C09K 8/32 |

OTHER PUBLICATIONS

International Search Report and Written Opinion for corresponding PCT Application Serial No. PCT/US2013/049656 dated Sep. 25, 2013, 12 pages.
Examination Report for the equivalent UK patent application 1500252.0 dated Feb. 28, 2017.
Examination Report for the equivalent UK patent application 1500252.0 dated May 16, 2017.
Examination Report for the equivalent UK patent application 1500252.0 dated Jul. 19, 2017.
Examination Report for the equivalent UK patent application 1500252.0 dated Sep. 27, 2017.

(Continued)

*Primary Examiner* — Alicia Bland
(74) *Attorney, Agent, or Firm* — David J. Smith

(57) ABSTRACT

In one aspect, embodiments disclosed herein relate to an oil-based wellbore fluid. The oil-based wellbore fluid may include an oleaginous liquid and a surface-modified precipitated silica, wherein the surface-modified precipitated silica comprises a lipophilic coating. In another aspect, embodiments disclosed herein relate to a method of drilling or servicing a well. The method may include circulating a wellbore fluid, such as that described in the paragraph above, into a wellbore, and recovering at least a portion of the wellbore fluid from the wellbore.

20 Claims, No Drawings

(56) References Cited

U.S. PATENT DOCUMENTS

| | | | |
|---|---|---|---|
| 2006/0188651 A1 | 8/2006 | Bradbury et al. | |
| 2006/0225615 A1 | 10/2006 | Raman et al. | |
| 2006/0228632 A1 | 10/2006 | Boyer et al. | |
| 2006/0254826 A1* | 11/2006 | Alberthy | C09K 8/03 175/72 |
| 2006/0281009 A1 | 12/2006 | Boyer et al. | |
| 2007/0036977 A1 | 2/2007 | Sinclair et al. | |
| 2007/0281867 A1* | 12/2007 | Massam | E21B 21/00 507/200 |
| 2008/0064613 A1 | 3/2008 | Massam | |
| 2008/0067468 A1 | 3/2008 | Pickens et al. | |
| 2008/0171673 A1 | 7/2008 | Lewis et al. | |
| 2009/0099047 A1 | 4/2009 | Cunningham et al. | |
| 2010/0009874 A1 | 1/2010 | Ballad et al. | |
| 2010/0071901 A1* | 3/2010 | Luo | C09K 8/80 166/280.2 |
| 2010/0147515 A1 | 6/2010 | Hughes et al. | |
| 2010/0292386 A1 | 11/2010 | Okel | |
| 2010/0305008 A1* | 12/2010 | Dino | C01B 33/44 507/131 |
| 2013/0029883 A1* | 1/2013 | Dismuke | C09K 8/602 507/219 |

\* cited by examiner

RESERVOIR WELLBORE FLUID

BACKGROUND

When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) or debris to the surface, controlling formation fluid pressure to prevent blowouts, maintaining wellbore stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used to place a packer, abandoning the well or preparing the well for abandonment, and otherwise treating or servicing the well or the formation.

During some drilling operations, the pressure differential between the circulating wellbore fluids and that of the formation being drilled may be maintained in an underbalanced mode. Underbalanced drilling is a method of drilling a desired subterranean formation where the hydrostatic pressure exerted by a column of wellbore fluid in the drill string is less than the natural pressure (pore pressure) inherent in the subterranean formation being drilled. Underbalanced drilling may prevent damage to the desired subterranean formation and in particular low pressure formations. Typically, the pressure differential is set to provide a margin above the pressure at which wellbore collapse might occur. The introduction of sufficient air, nitrogen or other gases to the wellbore fluids has been used to reduce the density of the commingled fluids and effectively decrease hydrostatic pressure. Other low density fluids such as emulsions, foams and mists have been used as a wellbore fluid to achieve an underbalanced condition.

Coiled tubing drilling may provide certain advantages when drilling or servicing a well in an underbalanced mode, such as a smaller rig footprint, less waste disposal, lower energy consumption, easier tripping in and out, as well as other advantages known to those in the art. The use of coiled tubing, which is a relatively thin walled strip of sheet metal coiled and edge-welded into a continuous tube which is able to transmit a longitudinal thrust force while being flexible enough to be wound onto a drum or passed around a bend, has been known in drilling operations for some time. Coiled tubing operations were originally developed for workovers (treatment, re-stimulation, and maintenance) of existing oil and gas wells. The continuous roll of tubing allowed for rapid insertion and retraction of downhole tools, and enabled these operations to be completed without the need for a conventional workover rig. Coiled tubing drilling (CTD) has been in use for some time, typically for the placement of substantially vertical, slim hole wells (typically gas wells), although CTD technology may be more recently used for deep directional and horizontal wells, as well as horizontal re-entry drilling.

SUMMARY OF THE DISCLOSURE

An oil-based wellbore fluid for use in coiled tubing drilling or other well servicing applications has been developed that may be thixotropic, even after aging and/or after incorporation of formation solids at downhole conditions, thus providing desired hydraulics while also achieving a relatively low mud density at a desired viscosity. The oil-based wellbore fluid may advantageously be used in underbalanced drilling or well servicing operations.

In one aspect, embodiments disclosed herein relate to an oil-based wellbore fluid. The oil-based wellbore fluid may include an oleaginous liquid and a surface-modified precipitated silica, wherein the surface-modified precipitated silica comprises a lipophilic coating.

In another aspect, embodiments disclosed herein relate to a method of drilling or servicing a well. The method may include circulating a wellbore fluid, such as that described in the paragraph above, into a wellbore, and recovering at least a portion of the wellbore fluid from the wellbore.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

In one aspect, embodiments disclosed herein relate to an oil-based wellbore fluid including a surface-modified precipitated silica. The surface-modified precipitated silica may function both as a weighting agent and as a viscosity modifier, thus providing for the desired properties of the wellbore fluid. The oil-based wellbore fluid may include an oleaginous base fluid, the surface modified precipitated silica, and optionally one or more of an organoclay; a wetting agent; a water-absorbing polymer, rheological modifiers, and various other additives as described below. In some embodiments, the fluid does not include an emulsifier.

Precipitated Silicas

Precipitated silicas useful in embodiments herein may include surface-modified precipitated silicas. The surface-modified precipitated silica may include a lipophilic coating, for example.

It has been found that surface-modified precipitated silicas according to embodiments herein may advantageously provide for both weighting and viscosifying of the oleaginous base fluid. Precipitated silicas according to embodiments herein are useful for providing wellbore fluids having enhanced thermal stability, while exhibiting a substantially constant rheological profile over time.

In some embodiments, the surface of the silica particles may be chemically modified by a number of synthetic techniques. Surface functionality of the particles may be tailored to improve solubility, dispersibility, or introduce reactive functional groups. This may be achieved by reacting the precipitated silica particles with organosilanes or siloxanes, in which reactive silane groups present on the molecule may become covalently bound to the silica lattice that makes up the particles. Non-limiting examples of compounds that may be used to functionalize the surface of the precipitated silica particles include aminoalkylsilanes such as aminopropyltriethoxysilane, aminomethyltriethoxysilane, trimethoxy[3-(phenylamino)propyl]silane, and trimethyl[3-(triethoxysilyl)propyl]ammonium chloride; alkoxyorganomercapto silanes such as bis(3-(triethoxysilylpropyl) tetrasulfide, bis(3-(triethoxysilylpropyl) disulfide, vinyltrimethoxy silane, vinyltriethoxy silane, 3-mercaptopropyltrimethoxy silane; 3-mercaptopropyltriethoxy silane; 3-aminopropyltriethoxysilane and 3-aminopropyltrimethoxysilane; and alkoxysilanes.

In other embodiments, organo-silicon materials that contain reactive end groups may be covalently linked to the surface of the silica particles. Reactive polysiloxanes may include, for example, diethyl dichlorosilane, phenyl ethyl diethoxy silane, methyl phenyl dichlorosilane, 3,3,3-trifluoropropylmethyl dichlorosilane, trimethylbutoxy silane, sym-diphenyltetramethyl disiloxane, octamethyl trisiloxane, octamethyl cyclotetrasiloxane, hexamethyl disiloxane, pentamethyl dichlorosilane, trimethyl chlorosilane, trimethyl methoxysilane, trimethyl ethoxysilane, methyl trichlorosilane, methyl triethoxysilane, methyl trimethoxysilane, hexamethyl cyclotrisiloxane, hexamethyldisiloxane, hexaethyldisiloxane, dimethyl dichlorosilane, dimethyl dimethoxy silane, dimethyl diethoxysilane, polydimethylsiloxanes comprising 3 to 200 dimethylsiloxy units, trimethyl siloxy or hydroxydimethylsiloxy end blocked poly(dimethylsiloxane) polymers (silicone oils) having an apparent viscosity within the range of from 1 to 1000 mPascals at 25 c., vinyl silane, gamm-methacryloxypropyl trimethoxy silane, polysiloxanes, e.g., polysiloxane spheres, and mixtures of such organo-silicone materials.

Precipitated silicas have a porous structure and may be prepared from the reaction of an alkaline silicate solution with a mineral acid. Alkaline silicates may be selected, for example, from one or more of sodium silicate, potassium silicate, lithium silicate and quaternary ammonium silicates. Precipitated silicas may be produced by the destabilization and precipitation of silica from soluble silicates by the addition of a mineral acid and/or acidic gases. The reactants thus include an alkali metal silicate and a mineral acid, such as sulfuric acid, or an acidulating agent, such as carbon dioxide. Precipitation may be carried out under alkaline conditions, for example, by the addition of a mineral acid and an alkaline silicate solution to water with constant agitation. The choice of agitation, duration of precipitation, the addition rate of reactants, temperature, concentration, and pH may vary the properties of the resulting silica particles. The surface modification may be added to the silica after precipitation. Alternatively, the silica may be precipitated in the presence of one or more of the surface modification agents described above.

Precipitated silicas useful in embodiments herein may include finely-divided particulate solid materials, such as powders, silts, or sands, as well as reinforced flocs or agglomerates of smaller particles of siliceous material. In some embodiments, the precipitated silica may have an average particle size ($D_{50}$) of less than 100 microns; less than 50 microns in other embodiments; and in the range from about 1 micron to about 40 microns, such as about 25 to about 35 microns, in yet other embodiments. In some embodiments, precipitated silicas having a larger initial average particle size may be used, where shear or other conditions may result in comminution of the particles, such as breaking up of agglomerates, resulting in a silica particle having a useful average particle size.

Precipitated silicas may contain varying amounts of residual alkali metal salts that result from the association of the corresponding silicate counterion with available anions contributed by the acid source. Residual salts may have the basic formula MX, where M is a group 1 alkali metal selected from Li, Na, K, Cs, a group 2 metal selected from Mg, Ca, and Ba, or organic cations such as ammonium, tetraalkyl ammonium, imidazolium, alkyl imidazolium, and the like; and X is an anion selected from halides such as F, Cl, Br, I, and/or sulfates, sulfonates, phosphonates, perchlorates, borates, and nitrates. In an embodiment, the residual salts may be selected from one or more of $Na_2SO_4$ and NaCl, and the precipitated silica may have a residual salt content (equivalent Na2SO4) of less than about 2 wt. %. While the pH of the resulting precipitated silicas may vary, embodiments of the silicas useful in embodiments disclosed herein may have a pH in the range from about 6.5 to about 9, such as in the range from about 6.8 to about 8.

The surface-modified precipitated silicas may have a BET-5 nitrogen surface area of less than about 200 $m^2/g$. In some embodiments, the surface area of the surface-modified precipitated silica may be less than about 150 $m^2/g$. In other embodiments, the surface area may be in the range from about 20 $m^2/g$ to about 70 $m^2/g$.

In one or more embodiments, the precipitated silica has a specific surface area of 20 $m^2/g$ to 70 $m^2/g$, as calculated from the surface adsorption of $N_2$ using the BET-1 point method, a pH in the range of pH 7.5 to pH 9, and an average particle diameter in the range of 20 nm to 100 nm.

In some embodiments, precipitated silicas useful in embodiments herein may include those as disclosed in U.S. Patent Application Publication Nos. 2010/0292386, 2008/0067468, 2005/0131107, 2005/0176852, 2006/0225615, 2006/0228632, and 2006/0281009, each of which is incorporated herein by reference to the extent not contradictory to embodiments herein.

Organoclays

Oleaginous or oil-based wellbore fluids according to embodiments herein may be formulated with organophilic clay viscosifiers or gellants that adjust the viscosity and/or desired rheological properties of the fluid. The inclusion of an organoclay into the oil-based fluid formulations disclosed herein may provide for desired suspension properties and increase the stability of the precipitated silicas and mitigate syneresis over the duration of a downhole operation. In some embodiments, the combination of silica and organoclay may be synergistic, achieving weighting and viscosity properties greater than either could achieve on their own.

Organoclays useful herein may include various organophilic clays such as LAPONITE® and other small fibrous clays such as the polygorskites (attapulgite and sepiolite). Other useful organophilic clays may include BENTONE®150, TRUVIS™, GARAMITE®1210, VG SUPREME™, and LAPONITE®, each of which are available from M-I L.L.C. (Houston, Tex.).

Attapulgite (or other non-hydratable clays such as sepiolite) may be dispersed in oleaginous-based wellbore fluids or may form colloids which are stable in other fluids such as high electrolyte solutions such as seawater. Attapulgite is a hydrous magnesium aluminosilica which is approximately spherical as opposed to the layered structure of smectite clays such as bentonite. This structure results in viscosification without hydration. Rather, viscosification of an attapulgite slurry results from shearing that elongates the clay particles into more of a needle or lathe shape. When suspended in liquid, these lathes bunch together into bundles that have a haystack appearance under an electron microscope. This clay does not swell when contacted with water, so its ability to build viscosity depends upon the extent on which the colloid is sheared.

In embodiments, the wellbore fluids disclosed herein may contain a non-hydratable clay, such as a clay having a needle-like or chain-like structure that results in viscosification through shearing. In various other embodiments, the non-hydratable clay may be selected from at least one of attapulgite and sepiolite clays. While the non-hydratable clays do not substantially swell in either fresh or salt water, they may still operate to thicken salt solutions. This thickening may be attributed to what is believed to be a unique orientation of charged colloidal clay particles in the dispersion medium.

In further embodiments, the wellbore fluids disclosed herein may be substantially free of hydrating clays. As used herein, "hydrating clays" is defined as those clays which swell appreciably (i.e., increase their volume by an amount of at least about 8 times) in either fresh water or salt water, and "substantially free" is defined as an amount that does not significantly affect dispersibility. Hydrating clays may include those clays which swell appreciably in contact with fresh water, but not when in contact with salt water, include, for example, clays containing sodium montmorillonite, such as bentonite. As described above, many hydrating clays have a sheet- or plate-like structure, which results in their expansion upon contact with water.

Solid Weighting Agents

If necessary, the density of the fluid may be increased by incorporation of a solid weighting agent. Solid weighting agents used in some embodiments disclosed herein may include a variety of inorganic compounds well known to one of skill in the art. In some embodiments, the weighting agent may be selected from one or more of the materials including, for example, barium sulphate (barite), calcium carbonate (calcite or aragonite), dolomite, ilmenite, hematite or other iron ores, olivine, siderite, manganese oxide, and strontium sulphate. In a particular embodiment, calcium carbonate or another acid soluble solid weighting agent may be used. In other embodiments, the weighting agent may be a precipitated silica, as described below.

One having ordinary skill in the art would recognize that selection of a particular material may depend largely on the density of the material because generally the lowest wellbore fluid viscosity at any particular density is obtained by using the highest density particles. In some embodiments, the weighting agent may be formed of particles that are composed of a material of specific gravity of at least 2.3; at least 2.4 in other embodiments; at least 2.5 in other embodiments; at least 2.6 in other embodiments; and at least 2.68 in yet other embodiments. Higher density weighting agents may also be used with a specific gravity of about 4.2, 4.4 or even as high as 5.2. For example, a weighting agent formed of particles having a specific gravity of at least 2.68 may allow wellbore fluids to be formulated to meet most density requirements yet have a particulate volume fraction low enough for the fluid to be pumpable. However, other considerations may influence the choice of product such as cost, local availability, the power required for grinding, and whether the residual solids or filtercake may be readily removed from the well. In particular embodiments, the wellbore fluid may be formulated with calcium carbonate or another acid-soluble material.

The solid weighting agents may be of any particle size (and particle size distribution), but some embodiments may include weighting agents having a smaller particle size range than API grade weighing agents, which may generally be referred to as micronized weighting agents. Such weighting agents may generally be in the micron (or smaller) range, including submicron particles in the nanosized range.

In some embodiments, the average particle size (d50) of the weighting agents may range from a lower limit of greater than 5 nm, 10 nm, 30 nm, 50 nm, 100 nm, 200 nm, 500 nm, 700 nm, 0.5 micron, 1 micron, 1.2 microns, 1.5 microns, 3 microns, 5 microns, or 7.5 microns to an upper limit of less than 500 nm, 700 microns, 1 micron, 3 microns, 5 microns, 10 microns, 15 microns, 20 microns, where the particles may range from any lower limit to any upper limit. In other embodiments, the d90 (the size at which 90% of the particles are smaller) of the weighting agents may range from a lower limit of greater than 20 nm, 50 nm, 100 nm, 200 nm, 500 nm, 700 nm, 1 micron, 1.2 microns, 1.5 microns, 2 microns, 3 microns, 5 microns, 10 microns, or 15 microns to an upper limit of less than 30 microns, 25 microns, 20 microns, 15 microns, 10 microns, 8 microns, 5 microns, 2.5 microns, 1.5 microns, 1 micron, 700 nm, 500 nm, where the particles may range from any lower limit to any upper limit. The above described particle ranges may be achieved by grinding down the materials to the desired particle size or by precipitation of the material from a bottoms up assembly approach. Precipitation of such materials is described in U.S. Patent Application Publication No. 2010/009874, which is assigned to the present assignee and herein incorporated by reference. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In one embodiment, a weighting agent is sized such that: particles having a diameter less than 1 microns are 0 to 15 percent by volume; particles having a diameter between 1 microns and 4 microns are 15 to 40 percent by volume; particles having a diameter between 4 microns and 8 microns are 15 to 30 by volume; particles having a diameter between 8 microns and 12 microns are 5 to 15 percent by volume; particles having a diameter between 12 microns and 16 microns are 3 to 7 percent by volume; particles having a diameter between 16 microns and 20 microns are 0 to 10 percent by volume; particles having a diameter greater than 20 microns are 0 to 5 percent by volume. In another embodiment, the weighting agent is sized so that the cumulative volume distribution is: less than 10 percent or the particles are less than 1 microns; less than 25 percent are in the range of 1 microns to 3 microns; less than 50 percent are in the range of 2 microns to 6 microns; less than 75 percent are in the range of 6 microns to 10 microns; and less than 90 percent are in the range of 10 microns to 24 microns.

The use of weighting agents having such size distributions has been disclosed in U.S. Patent Application Publication Nos. 2005/0277553 and 2010/0009874, which are assigned to the assignee of the current application, and herein incorporated by reference. Particles having these size distributions may be obtained any means known in the art.

In some embodiments, the weighting agents include dispersed solid colloidal particles with a weight average particle diameter (d50) of less than 10 microns that are coated with an organophilic, polymeric deflocculating agent or dispersing agent. In other embodiments, the weighting agents include dispersed solid colloidal particles with a weight average particle diameter (d50) of less than 8 microns that are coated with a polymeric deflocculating agent or dispersing agent; less than 6 microns in other embodiments; less than 4 microns in other embodiments; and less than 2 microns in yet other embodiments. The fine particle size will generate suspensions or slurries that will show a reduced tendency to sediment or sag, and the polymeric dispersing agent on the surface of the particle may control the inter-particle interactions and thus will produce lower rheological profiles. It is the combination of fine particle size and control of colloidal interactions that reconciles the two objectives of lower viscosity and minimal sag.

In some embodiments, the weighting agents may be uncoated. In other embodiments, the weighting agents may be coated with an organophilic coating such as a dispersant, including carboxylic acids of molecular weight of at least 150 Daltons, such as oleic acid, stearic acid, and polybasic fatty acids, alkylbenzene sulphonic acids, alkane sulphonic acids, linear alpha-olefin sulphonic acid, and alkaline earth metal salts thereof. Further examples of suitable dispersants may include a polymeric compound, such as a polyacrylate ester composed of at least one monomer selected from stearyl methacrylate, butylacrylate and acrylic acid monomers. The illustrative polymeric dispersant may have an average molecular weight from about 10,000 Daltons to about 200,000 Daltons and in another embodiment from about 17,000 Daltons to about 30,000 Daltons. One skilled in the art would recognize that other acrylate or other unsaturated carboxylic acid monomers (or esters thereof) may be used to achieve substantially the same results as disclosed herein.

In embodiments, the coated weighting agents may be formed by either a dry coating process or a wet coating process. Weighting agents suitable for use in other embodiments disclosed herein may include those disclosed in U.S. Patent Application Publication Nos. 2004/0127366, 2005/0101493, 2006/0188651, 2008/0064613, and U.S. Pat. Nos. 6,586,372 and 7,176,165, each of which is hereby incorporated by reference.

The particulate materials as described herein (i.e., the coated and/or uncoated weighting agents) may be added to a wellbore fluid as a weighting agent in a dry form or concentrated as slurry in either an aqueous medium or as an organic liquid. As is known, an organic liquid may have the environmental characteristics required for additives to oil-containing wellbore fluids. With this in mind, the oleaginous fluid may have a kinematic viscosity of less than 10 centistokes (10 mm2/s) at 40° C. and, for safety reasons, a flash point of greater than 60° C., although not required for all applications. Suitable oleaginous liquids are, for example, diesel oil, mineral or white oils, n-alkanes or synthetic oils such as alpha-olefin oils, ester oils, mixtures of these fluids, as well as other similar fluids known to one of skill in the art of drilling or other wellbore fluid formulation. In one embodiment, the desired particle size distribution is achieved via wet milling of the coarser materials in the desired carrier fluid.

Such solid weighting agents may be particularly useful in wellbore fluids formulated with an entirely oleaginous fluid phase. In a particular embodiment, an organophilic coated weighting agent having a particle size within any of the described ranges may be used in a fluid free of or substantially free of an aqueous phase contained therein. Solid weighting agents may also be used in the direct emulsion emulsions of the present disclosure to provide additional density beyond that provided by the aqueous phase as needed.

Other Additives

Other additives that may be included in the wellbore fluids disclosed herein include, for example, gelling agents, wetting agents, viscosifiers, surfactants, emulsifiers, dispersants, interfacial tension reducers, pH buffers, mutual solvents, thinners, thinning agents, rheological additives, absorbent polymers, and cleaning agents, among others. In some embodiments, the fluid does not include an emulsifier, as use of an emulsifier may interfere with the viscosity effect observed with use of the surface-modified precipitated silicas.

Suitable wetting agents may include fatty acids, organic phosphate esters, modified imidazolines, amidoamines, alkyl aromatic sulfates, and sulfonates. For example, SUREWET®, which is commercially available from M-I LLC, Houston, Tex., is an oil based wetting agent including oleic acid that may be used to wet fines and drill solids to prevent water-wetting of solids. Moreover, SUREWET® may improve thermal stability, rheological stability, filtration control, emulsion stability of wellbore fluids. Although various wetting agents have been listed above, testing has shown that not all surface-modified precipitated silicas work with all wetting agents, and may be due to compatibility of the surface modification and the wetting agent components. SUREWET, for example, has been shown to be effective with polysiloxane, aminoalkylsilane, and alkoxyorganomercaptosilane coatings, whereas other wetting agents tested may not exhibit similar compatibility. Accordingly, when used, the wetting agent may be selected to provide a desired interaction with the surface-modified precipitated silica.

Suitable rheological additives in accordance with embodiments of the present disclosure, for example, may include alkyl diamides, such as those having a general formula: $R_1-HN-CO-(CH_2)_n-CO-NH-R_2$, wherein n is an integer from 1 to 20, more preferably from 1 to 4, yet more preferably from 1 to 2, and $R_1$ is an alkyl groups having from 1 to 20 carbons, more preferably from 4 to 12 carbons, and yet more preferably from 5 to 8 carbons, and $R_2$ is hydrogen or an alkyl group having from 1 to 20 carbons, or more preferably is hydrogen or an alkyl group having from 1 to 4 carbons, wherein $R_1$ and $R_2$ may or may not be identical. Such alkyl diamides may be obtained, for example, from M-I L.L.C. (Houston, Tex.) under the trade name of Versa-Pac™.

In some embodiments, the wellbore fluids herein may include up to about 5 vol % water; up to about 3 vol % water in other embodiments, and up to about 1 vol % or 2 vol % water in yet other embodiments. In some embodiments, the wellbore fluid may be considered an "all-oil" based wellbore fluid. As used herein, "all-oil" refers to the fluid being essentially free of free water (e.g., including water not bound to another component in the fluid, a dispersed water phase, or water emulsified in the oil phase). For example, embodiments herein may include a water-absorbing polymer, such as a polyacrylate, to pull residual, entrained, or produced water out of the fluid, binding the water so as to limit the water's ability to interact with the surface-modified precipitated silicas, organoclays, or other additives, minimizing or negating any effect the water may have on the desired properties of the fluid.

Wellbore Fluid Formulation

The surface-modified precipitated silicas, organoclays, and other additives described above may be combined in an oleaginous fluid (oil-based) wellbore fluid to result in wellbore fluids in accordance with described embodiments.

The oleaginous fluid may be a hydrocarbonaceous liquid, such as a natural or synthetic oil, including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; and similar compounds known to one of skill in the art; and mixtures thereof.

Conventional methods can be used to prepare the wellbore fluids disclosed herein in a manner analogous to those normally used to prepare oil-based wellbore fluids. In one embodiment, a desired quantity of oleaginous fluid, such as a base oil, and a suitable amount of one or more precipitated silicas are mixed together along with any remaining components.

As described above, oil-based wellbore fluids according to embodiments herein may include an oleaginous liquid and a surface-modified precipitated silica, wherein the surface-modified precipitated silica comprises a lipophilic coating. The oil-based wellbore fluids may additionally include various additives, such as organoclays, wetting agents, and water-absorbent polymers, among others.

The oil-based wellbore fluids disclosed herein may have a density of less than about 8.0 lb/gal. In some embodiments the oil-based wellbore fluids may have a density of less than about 7.7 lb/gal; in the range from about 3 lb/gal to about 8 lb/gal in other embodiments; and in the range from about 6.7 lb/gal to about 7.5 lb/gal in other embodiments, such as in the range from about 6.9 to about 7.2 lb/gal.

The oil-based wellbore fluids may be formulated such that the surface-modified precipitated silica is present in an amount ranging from about 5 ppb (pounds per barrel) to greater than about 25 ppb, based on a total volume of the wellbore fluid; in an amount ranging from about 10 ppb to about 25 ppb in other embodiments. In other embodiments, the oil-based wellbore fluids may be formulated such that the surface-modified precipitated silica is present in an amount ranging from about 15 ppb to about 24 ppb, such as in the range from about 20 ppb to about 23 ppb or in the range from about 21 to about 22 ppb.

When an organoclay is used, oil-based wellbore fluids may be formulated such that the organoclay is present in an amount ranging from about 2 ppb to about 15 ppb. In some embodiments, the oil-based wellbore fluids may be formulated such that the organoclay is present in an amount ranging from about 3 ppb to about 12 ppb, such as in the range from about 4 ppb to about 8 ppb.

The above described wellbore fluids may be useful as a wellbore fluid, or as a well servicing fluid in a variety of wellbore operations, such as gravel packing, well stimulation, wellbore cleaning, logging, perforating, nitrogen kick-off, sand control, drilling, cementing, well circulation, and mechanical isolation. The surface-modified precipitated silicas may also be useful in oil-based breaker fluids.

The "all-oil" wellbore fluids including a surface-modified precipitated silica according to embodiments herein may provide improved hydraulic properties to the wellbore fluid. In some embodiments, the improved hydraulic properties may be especially useful in underbalanced drilling or well servicing operations in both conventional or coiled tubing drilling. Fluids herein may also be used to drill in overbalanced conditions. The viscosified wellbore fluid may provide for excellent cleaning or drill cuttings removal from a wellbore. The all-oil wellbore fluids herein, however, may tolerate recirculated solids (drill cuttings or removed debris) at a higher ratio than water-based fluids commonly used. For example, wellbore fluids disclosed herein for coiled tubing drilling may tolerate accumulation of up to about 3 vol %, 4 vol %, 5 vol % or more recirculated solids (such as due to incomplete separation of small drilled solids similar in size to weighting agents, etc., from the fluid before recirculation) before the wellbore fluid needs to be replaced. For example, circulating wellbore fluids according to embodiments herein may contain at least about 2 vol % drilled solids or wellbore debris. In contrast, water based fluids for coiled tubing drilling may only tolerate up to about 1 vol. % recirculated solids; thus, water-based fluids may require turnover up to three times or more before wellbore fluids according to embodiments disclosed herein would require turnover. Additionally, the thixotropic fluids disclosed herein may be pumped at greater rates, such as up to about 3 bbl/min as compared to 1.5 to 1.75 bbl/min for water-based fluids in similar sized coiled tubing. Thus, overall, drilling runs may be longer and drilling performance and efficiency may be improved. As another advantage, use of wellbore fluids herein for underbalanced drilling, as having a lower density than water-based fluids, may result in less fluid losses to the formation. The "all-oil" wellbore fluids, including a surface-modified precipitated silica, according to embodiments herein may also prolong the life of the fluid versus typical thixotropic fluids where a biopolymer such as xanthan, welan, diutan, etc. gum is used to create viscosity. For example, circulating wellbore fluids that use a biopolymer to drill to and through a target formation require a new system after drilling only one well or even after drilling several thousand feet before sufficient hydraulics and hole cleaning are no longer effective. This "all-oil" wellbore fluid including a surface-modified precipitated silica, according to embodiments herein, may also prolong the life of the coil tubing, reducing wear and fatigue and reduce time required for pulling/cutting the coil.

In some embodiments, wellbore fluids according to embodiments disclosed herein may include:

- an oleaginous base fluid, such as a mineral oil, a synthetic oil, or a diesel oil;
- a viscosifying and weighting agent, namely a surface-modified precipitated silica, present in the range from about 10 to about 25 ppb, such as about 15 ppb to about 22 ppb;
- an alkalinity control agent, such as lime, present in the range from about 1 to about 3 ppb, such as about 2 ppb;
- a fluid loss control agent, such as ECOTROL, present in the range from about 0.5 to about 2.5 ppb, such as about 1 ppb;
- a water absorbing agent, such as a polyacrylate, present in an amount from about 0.05 ppb to about 0.5 ppb, such as about 0.25 ppb;
- a wetting agent, such as SUREWET, present in the range from about 1 to about 3 ppb, such as about 2 ppb;
- an organoclay, such as TRUVIS, present in the range from about 4 to about 8 ppb, such as about 5 ppb to 7 ppb; and
- in some embodiments, a weighting agent, such as a micronized weighting agent, present in the range from about 2 to about 25 ppb.

The "all-oil" wellbore fluid systems disclosed herein may provide significant benefits for reservoir drilling, such as in coiled tubing drilling applications. For example, the low density of the all-oil wellbore fluid may be beneficial for drilling in formations, such as fractured, cavernous, or vugular formations, and may provide advantageous fluid loss control properties, even when drilling in relatively sandy formations, less viscosity variation with temperature, sustained viscosity with aging as well as at downhole conditions, as well as other benefits as may be recognizable to those skilled in the art. Additionally, the "all-oil" wellbore fluid may be compatible with an "oil-wet" reservoir. Further, the "all-oil" wellbore fluids disclosed herein may be advantageous with respect to reducing corrosion in the tubulars and drillstrings used in coiled tubing operations.

EXAMPLES

Comparative Example 1

Various wellbore fluids were formulated to include a precipitated silica, namely HISIL 532EP, an uncoated precipitated silica (not a surface-modified precipitated silica) having a particle size ($D_{50}$) of about 12 microns (available from PPG Industries, Pittsburgh, Pa.). These formulations are shown in Table 1.

Other components in the formulations as shown in Tables 1 and 2 may include:

LVT200, a mineral oil (base fluid) available from Geo Wellbore fluids Inc. (Bakersfield, Calif.);

BENTONE™ 38, an organically modified clay rheological additive available from Elementis Specialties (Highstown, N.J.);

CLAYTONE IMG 400, an organophilic clay gellant available from Southern Clay Products, Inc. (Gonzales, Tex.);

ECOTROL™, an oil soluble polymer useful as a fluid loss additive, available from M-I L.L.C. (Houston, Tex.), VERSAPAC™, an organic thixotrope, available from M-I L.L.C. (Houston, Tex.), VERSAMOD™, an organic gelling agent, available from M-I L.L.C. (Houston, Tex.), and VERSAMUL™ emulsifier, available from M-I L.L.C. (Houston, Tex.); Lime, as an alkalinity control agent;

VERSAGEL HT, a naturally occurring high-temperature gilsonite used for HTHP filtration control in all oil systems, available from M-I L.L.C. (Houston, Tex.);

TRUVIS, an organoclay available from M-I L.L.C. (Houston, Tex.);

ACTIMUL, a wetting agent available from M-I L.L.C. (Houston, Tex.);

ONEMUL, a wetting agent available from M-I L.L.C. (Houston, Tex.);

SUREWET, an oil based wetting agent including oleic acid, available from M-I L.L.C.;

NOVAWET+, NOVAWET NC, and NOVAWET, wetting agents available from M-I L.L.C. (Houston, Tex.); and POLYSWELL, 1a water absorbing agent, available from M-I L.L.C. (Houston, Tex.).

Rheological properties of the formulations with 532EP are also shown in Tables 1 and 2. A majority of the formulations with 532EP, a precipitated silica having no surface treatments, were unstable, losing rheological properties or falling apart (separating). A few were stable, were considered for use in wellbore fluid formulations, and some were tested for use as a reservoir drilling fluid as will be described below.

Example 2

TABLE 1

| Products | #1 | #2 | #3 | #4 | #5 | #6 | #7 | #8 | #9 | #10 |
|---|---|---|---|---|---|---|---|---|---|---|
| LVT 200 | 275.9 | 277.0 | 272.0 | 270.0 | 270.0 | 271.0 | 270.6 | 270.6 | 267.0 | 267.0 |
| 532EP | | | 21.0 | 21.0 | 21.0 | 21.0 | 25.0 | 21.0 | 25.0 | 25.0 |
| VERSAPAC | 6.0 | 6.0 | | 4.0 | | 0.5 | 1.5 | | | |
| VERSAMUL | 1.0 | 1.0 | 1.0 | | | | | | | |
| VERSAMOD | 0.5 | | 0.5 | | | | | | 0.5 | 0.5 |
| ECOTROL | 1.0 | 1.0 | 1.0 | | | | | | 1.0 | 1.0 |
| LIME | 2.0 | 1.0 | 2.0 | 2.0 | 2.0 | 2.0 | 2.0 | 2.0 | 2.0 | 2.0 |
| IMG 400 | | | 2.0 | 8.0 | 8.0 | 8.0 | 8.0 | 8.0 | 8.0 | 8.0 |
| VERSAGEL HT | 2.0 | | | | | | | | | |
| TRUVIS | | | | | | | | | | |
| ACTIMUL | | | | | | 1.0 | 1.0 | | 1.0 | |
| ONEMUL | | | | 2.0 | 2.0 | | | | | |
| SUREWET | | | | | | | | 1.0 | | 1.0 |
| NOVAWET + | | | | | | | | | | |
| NOVAWET NC | | | | | | | | | | |
| NOVAWET | | | | | | | | | | |
| POLLYSWELL | | | | | | | | | | |

| RHEOLOGY | Post Shear | | | Pre Shear | | | | | Pre Shear | |
|---|---|---|---|---|---|---|---|---|---|---|
| TEMP (° F.) | 80 | 120 | 150 | 80 | 120 | 150 | Pre Shear | Pre Shear | 120 | |
| 600 | 96 | 43 | 34 | 35 | 29 | 24 | Sample | Failed | 22 | |
| 300 | 70 | 29 | 23 | 19 | 25 | 20 | locked up | Looses | 16 | |
| 200 | 59 | 23 | 19 | 26 | 23 | 18 | | Rheology | 14 | |
| 100 | 46 | 17 | 14 | 23 | 20 | 15 | | | 12 | |
| 6 | 31 | 10 | 9 | 15 | 13 | 10 | | | 8 | |
| 3 | 28 | 9 | 8 | 14 | 12 | 9 | | | 7 | |
| PV | 26 | 14 | 11 | 6 | 4 | 4 | | | 6 | |
| YP | 44 | 15 | 12 | 23 | 21 | 16 | | | 10 | |

| | Post Shear | | | Post Shear | | | Post Shear | Post Shear | Post Shear |
|---|---|---|---|---|---|---|---|---|---|
| TEMP (° F.) | 80 | 120 | 150 | 80 | 120 | 150 | 120 | 120 | 120 |
| 600 | | 76 | 41 | 38 | 31 | 26 | 23 | 16 | 25 | 24 |
| 300 | | 51 | 27 | 25 | 25 | 22 | 19 | 11 | 16 | 17 |
| 200 | | 41 | 22 | 20 | 23 | 19 | 17 | 9 | 13 | 14 |
| 100 | | 30 | 16 | 15 | 19 | 17 | 15 | 8 | 9 | 10 |
| 6 | | 18 | 10 | 10 | 9 | 8 | 6 | 8 | 4 | 5 |
| 3 | | 17 | 9 | 9 | 7 | 6 | 5 | 7 | 3 | 4 |
| PV | | 25 | 14 | 10 | 6 | 4 | 4 | 5 | 9 | 7 |
| YP | | 26 | 13 | 15 | 19 | 18 | 15 | 6 | 7 | 10 |

TABLE 1-continued

| Products | #1 | #2 | #3 | #4 | #5 | #6 | #7 | #8 | #9 | #10 |
|---|---|---|---|---|---|---|---|---|---|---|
| TEMP (°F.) | After Ageing 120 | After Ageing 120 | After Ageing 120 | | | After Ageing 120 | After Ageing 120 | After Ageing 120 | After Ageing 120 | After Ageing 120 |
| 600 | Failed Falls Apart | Failed Falls Apart | Failed Falls Apart | | | 12 | 15 | Failed Looses Rheology | Failed Looses Rheology | Failed Looses Rheology |
| 300 | | | | | | 8 | 11 | | | |
| 200 | | | | | | 6 | 10 | | | |
| 100 | | | | | | 4 | 8 | | | |
| 6 | | | | | | 3 | 5 | | | |
| 3 | | | | | | 2 | 4 | | | |
| PV | | | | | | 4 | 4 | | | |
| YP | | | | | | 4 | 7 | | | |

TABLE 2

| Products | #11 | #12 | #13 | #14 | #15 | #16 | #17 | #18 | #19 |
|---|---|---|---|---|---|---|---|---|---|
| LVT 200 | 267.0 | 267.0 | 267.0 | 267.0 | 267.0 | 267.0 | 267.0 | 267.0 | 267 |
| 532EP | 25.0 | 25.0 | 25.0 | 25.0 | 25.0 | 25.0 | 25.0 | 25.0 | 25 |
| VERSAPAC | | | | | | | | | |
| VERSAMUL | | | | | | | 2.0 | | |
| VERSAMOD | 0.5 | 0.5 | 0.5 | 0.5 | 0.5 | 0.5 | 0.5 | 0.5 | |
| ECOTROL | 1.0 | 1.0 | 1.0 | 1.0 | 1.0 | 1.0 | 1.0 | 1.0 | 1.0 |
| LIME | 2.0 | 2.0 | 2.0 | 2.0 | 2.0 | 2.0 | 2.0 | 2.0 | 2 |
| IMG 400 | 8.0 | 8.0 | 8.0 | 8.0 | 8.0 | 8.0 | 8.0 | 8.0 | |
| VERSAGEL HT | | | | | | | | | |
| TRUVIS | | | | | | | | | 6 |
| ACTIMUL | | | | | 2.0 | | | | |
| ONEMUL | | | | | | | | | |
| SUREWET | | | | | | 2.0 | | | 2 |
| NOVAWET + | 1.0 | | | | | | | | |
| NOVAWET NC | | 1.0 | | | | | | | |
| NOVAWET | | | 1.0 | 2.0 | | | | | |
| POLLYSWELL | | | | | | | | 0.8 | 0.25 |

| RHEOLOGY TEMP (°F.) | | | | | | | | | Pre Shear 120 |
|---|---|---|---|---|---|---|---|---|---|
| 600 | | | | | | | | | 21 |
| 300 | | | | | | | | | 15 |
| 200 | | | | | | | | | 13 |
| 100 | | | | | | | | | 11 |
| 6 | | | | | | | | | 10 |
| 3 | | | | | | | | | 9 |
| PV | | | | | | | | | 6 |
| YP | | | | | | | | | 9 |

| TEMP (°F.) | | | | | | | | | Post Shear 120 |
|---|---|---|---|---|---|---|---|---|---|
| 600 | | | | | | | | | 19 |
| 300 | | | | | | | | | 13 |
| 200 | | | | | | | | | 11 |
| 100 | | | | | | | | | 8 |
| 6 | | | | | | | | | 3 |
| 3 | | | | | | | | | 2 |
| PV | | | | | | | | | 6 |
| YP | | | | | | | | | 7 |

| | After Ageing | After Ageing | After Ageing | After Ageing | After Ageing | After Ageing | | | After Ageing | | | After Ageing | After Ageing |
|---|---|---|---|---|---|---|---|---|---|---|---|---|---|
| TEMP (°F.) | 120 | 120 | 120 | 120 | 120 | 80 | 120 | 150 | 80 | 120 | 150 | 120 | 120 |
| 600 | Failed Looses Rheology | Failed Looses Rheology | Failed Looses Rheology | Failed Looses Rheology | Failed Looses Rheology | 36 | 28 | 21 | 31 | 26 | 20 | 27 | 32 |
| 300 | | | | | | 25 | 20 | 15 | 21 | 18 | 16 | 16 | 23 |
| 200 | | | | | | 20 | 17 | 12 | 17 | 15 | 14 | 14 | 19 |
| 100 | | | | | | 16 | 14 | 10 | 12 | 12 | 11 | 10 | 14 |
| 6 | | | | | | 10 | 7 | 5 | 9 | 10 | 9 | 8 | 8 |
| 3 | | | | | | 9 | 6 | 4 | 8 | 9 | 7 | 7 | 7 |
| PV | | | | | | 11 | 8 | 6 | 10 | 8 | 4 | 11 | 9 |
| YP | | | | | | 14 | 12 | 9 | 11 | 10 | 12 | 5 | 14 |

A wellbore fluid including a surface-modified precipitated silica, H303, a polysiloxane treated precipitated silica having an average particle size of about 30 microns ($D_{50}$) (available from PPG Industries, Pittsburgh, Pa.), was formulated as shown in Table 3. Rheological properties are also shown in Table 3. The remaining components are as described above. H303 provided a stable wellbore fluid and was tested for use as a reservoir drilling fluid as described below.

Example 3

TABLE 3

| Products | #1 |
|---|---|
| LVT 200 | 272.0 |
| Hi-Sil H303 | 25.0 |
| TRUVIS | 6.0 |
| ECOTROL | 1.0 |
| LIME | 2.0 |
| SUREWET | 2 |
| POLLYSWELL | 0.25 |
| RHEOLOGY | Pre Shear |
| TEMP (° F.) | 120 |
| 600 | 18 |
| 300 | 10 |
| 200 | 7 |
| 100 | 4 |
| 6 | 2 |
| 3 | 1 |
| PV | 8 |
| YP | 2 |
| | Post Shear |
| TEMP (° F.) | 120 |
| 600 | 26 |
| 300 | 18 |
| 200 | 15 |
| 100 | 11 |
| 6 | 5 |
| 3 | 4 |
| PV | 8 |
| YP | 10 |
| | After Ageing |
| TEMP (° F.) | 120 |
| 600 | 27 |
| 300 | 20 |
| 200 | 17 |
| 100 | 13 |
| 6 | 7 |
| 3 | 6 |
| PV | 7 |
| YP | 13 |

Wellbore fluid including a surface-modified precipitated silica, AGILON 400D, a surface-modified precipitated silica having a mercapto organometallic treatment (available from PPG Industries, Pittsburgh, Pa.), was formulated as shown in Table 4. Rheological properties are also shown in Table 3. The remaining components are as described above. AGILON 400D provided a stable wellbore fluid and was tested for use as a reservoir drilling fluid as described below.

Example 4

TABLE 4

| Products | #1 | #2 | #2 |
|---|---|---|---|
| LVT 200 | 267.0 | 279.0 | 272.0 |
| AGILON 400D | 25.0 | 12 | 20.0 |
| TRUVIS | 6.0 | 6.0 | 6.0 |
| ECOTROL | 1.0 | 1.0 | 1.0 |
| LIME | 2.0 | 2.0 | 2.0 |
| SURE WET | 2 | 2 | 2 |
| POLLYSWELL | 0.25 | 0.25 | 0.25 |
| RHEOLOGY | Pre Shear | Pre Shear | Pre Shear |
| TEMP (° F.) | 120 | 120 | 120 |
| 600 | 14 | | |
| 300 | 9 | | |
| 200 | 6 | | |
| 100 | 4 | | |
| 6 | 2 | | |
| 3 | 1 | | |
| PV | 5 | | |
| YP | 4 | | |
| | Post Shear | Post Shear | Post Shear |
| TEMP (° F.) | 120 | 120 | 120 |
| 600 | 71 | 18 | 44 |
| 300 | 64 | 11 | 37 |
| 200 | 59 | 10 | 34 |
| 100 | 54 | 7 | 30 |
| 6 | 28 | 4 | 21 |
| 3 | 19 | 3 | 18 |
| PV | 9 | 7 | 7 |
| YP | 55 | 4 | 30 |
| | After Ageing | After Ageing | After Ageing |
| TEMP (° F.) | 120 | 120 | 120 |
| 600 | N/A | N/A | 45 |
| 300 | | | 32 |
| 200 | | | 27 |
| 100 | | | 20 |
| 6 | | | 8 |
| 3 | | | 7 |
| PV | | | 13 |
| YP | | | 19 |

Selected wellbore fluid formulations described above were tested to determine their stability and appropriateness for use when containing drill solids. The selected formulas, as shown in Table 5 were mixed with simulated drill solids (60% silica flour and 40% rev dust). The formulations and rheological properties of the formulations with drill solids are also shown in Table 5.

TABLE 5

| Products | Hi-Sil 303 + 1% v/v Drill Solids | Hi-Sil 303 + 1% v/v Drill Solids | Hi-Sil 303 + 3% v/v Drill Solids | Hi-Sil 532EP + 1% v/v Drill Solids | Agilon 400D + 1% v/v Drill Solids | Agilon 400D + 2% v/v Drill Solids | Agilon 400D + 3% v/v Drill Solids |
|---|---|---|---|---|---|---|---|
| LVT 200 | 267.0 | 279.0 | 272.0 | 272.0 | 279.0 | 279.0 | 279.0 |
| Hi-Sil H303 | 20.0 | 20 | 20.0 | | | | |
| Hi-Sil 532EP | | | | 25.0 | | | |
| Aligon 400D | | | | | 20 | 20 | 20 |
| TRUVIS | 6.0 | 6.0 | 6.0 | 6.0 | 6.0 | 6.0 | 6.0 |
| ECOTROL | 1.0 | 1.0 | 1.0 | 1.0 | 1.0 | 1.0 | 1.0 |
| LIME | 2.0 | 2.0 | 2.0 | 2.0 | 2.0 | 2.0 | 2.0 |
| SUREWET | 2 | 2 | 2 | 2 | 2 | 2 | 2 |
| POLLYSWELL | 0.25 | 0.25 | 0.25 | 0.25 | 0.25 | 0.25 | 0.25 |
| Drill Solids % v/v | 1 | 2 | 3 | 1 | 1 | 2 | 3 |

| TEMP (° F.) | Post Shear 120 | Post Shear 120 | Post Shear 120 | Post Shear 120 | Post Shear 120 | Post Shear 120 | Post Shear 120 |
|---|---|---|---|---|---|---|---|
| 600 | 24 | 29 | 31 | 19 | 31 | 37 | 42 |
| 300 | 16 | 20 | 21 | 13 | 23 | 27 | 31 |
| 200 | 14 | 17 | 18 | 11 | 19 | 23 | 26 |
| 100 | 10 | 12 | 14 | 8 | 16 | 18 | 21 |
| 6 | 4 | 6 | 6 | 3 | 9 | 11 | 12 |
| 3 | 3 | 5 | 5 | 2 | 7 | 9 | 9 |
| PV | 98 | 9 | 10 | 6 | 8 | 10 | 11 |
| YP | 8 | 11 | 11 | 7 | 15 | 17 | 20 |

| TEMP (° F.) | After Ageing 120 | After Ageing 120 | After Ageing 120 | After Ageing 120 | After Ageing 120 | After Ageing 120 | After Ageing 120 |
|---|---|---|---|---|---|---|---|
| 600 | 27 | 31 | 36 | 21 | 32 | 34 | 43 |
| 300 | 19 | 22 | 27 | 14 | 22 | 23 | 33 |
| 200 | 15 | 18 | 21 | 11 | 19 | 19 | 27 |
| 100 | 12 | 14 | 16 | 7 | 14 | 14 | 21 |
| 6 | 7 | 9 | 9 | 2 | 6 | 6 | 8 |
| 3 | 6 | 8 | 8 | 1 | 5 | 5 | 6 |
| PV | 8 | 9 | 9 | 10 | 10 | 11 | 10 |
| YP | 11 | 13 | 18 | 4 | 12 | 12 | 23 |

As shown in Table 5, the formulation with 532EP was not suitable for use as a reservoir drilling fluid at a loading of only 1% drill solids, as based on the significant decrease in yield point. In contrast, the formulations with surface-modified precipitated silicas were shown to be stable at loadings of 1% drill solids, as well as 2% drill solids and 3% drill solids.

As described above, surface-modified precipitated silicas may have a significant impact on the weighting and viscosity of an all oil-based wellbore fluid. Embodiments disclosed herein may provide for desired hydraulic properties of a wellbore fluid, such that the wellbore fluid may be advantageously used in underbalanced drilling and wellbore servicing operations, including coiled tubing drilling operations.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. An oil-based wellbore fluid, comprising:
   an oleaginous liquid;
   a surface-modified precipitated silica, wherein the surface-modified precipitated silica comprises a lipophilic coating; and
   an organoclay.

2. The fluid of claim 1, wherein the lipophilic coating comprises at least one of a polysiloxane, an aminoalkylsilane, and an alkoxyorganomercaptosilane.

3. The fluid of claim 1, wherein the surface modified precipitated silica has an average particle size ($D_{50}$) of less than 100 microns.

4. The fluid of claim 1, wherein the oleaginous liquid comprises at least one of a diesel oil, a mineral oil, and a synthetic oil.

5. The fluid of claim 1, wherein the fluid has a density of less than about 9.0 lb/gal.

6. The fluid of claim 1, wherein the precipitated silica is present in an amount ranging from about 10 ppb to about 25 ppb, based on a total volume of the fluid.

7. The fluid of claim 1, wherein the organoclay is present in an amount ranging from about 4 ppb to about 8 ppb, based on a total volume of the fluid.

8. The fluid of claim 1, further comprising at least one of drilled solids, a gravel packing material, a fluid loss control agent, and a micronized weighting agent.

9. The fluid of claim 1, wherein the fluid does not include an emulsifier.

10. The fluid of claim 1, wherein the fluid further comprises a wetting agent or a water-absorbing polymer.

11. The fluid of claim 1, wherein the organoclay is a polygorskite.

12. The fluid of claim 1, wherein the organoclay is attapulgite or sepiolite.

13. The fluid of claim 1, wherein the fluid is substantially free of hydrating clays.

14. The fluid of claim 1, wherein the organoclay is present in an amount ranging from about 2 ppb to about 15 ppb, based on a total volume of the fluid.

15. The fluid of claim 1, wherein the precipitated silica as a BET-5 nitrogen surface area of less than about 200 $m^2/g$.

16. The fluid of claim 8, wherein the micronized weighting agent is selected from the group consisting of barite, calcite, dolomite, ilmenite, hematite, olivine, siderite, manganese oxide, and strontium sulphate.

17. An oil-based wellbore fluid, comprising:
an oleaginous liquid;
a surface-modified precipitated silica, wherein the surface-modified precipitated silica comprises a polysiloxane coating; and
an organoclay.

18. The fluid of claim 17, wherein the polysiloxane is selected from the group consisting of diethyl dichlorosilane, phenyl ethyl diethoxy silane, methyl phenyl dichlorosilane, 3,3,3-trifluoropropylmethyl dichlorosilane, trimethylbutoxy silane, sym-diphenyltetramethyl disiloxane, octamethyl trisiloxane, octamethyl cyclotetrasiloxane, hexamethyl disiloxane, pentamethyl dichlorosilane, trimethyl chlorosilane, trimethyl methoxysilane, trimethyl ethoxysilane, methyl trichlorosilane, methyl triethoxysilane, methyl trimethoxysilane, hexamethyl cyclotrisiloxane, hexamethyldisiloxane, hexaethyldisiloxane, dimethyl dichlorosilane, dimethyl dimethoxy silane, dimethyl diethoxysilane, polydimethylsiloxanes comprising 3 to 200 dimethylsiloxy units, trimethyl siloxy or hydroxydimethylsiloxy end blocked poly(dimethylsiloxane) polymers having an apparent viscosity range of from 1 to 1000 mPascals at 25° C., vinyl silane, gammmethacryloxypropyl trimethoxy silane, polysiloxanes, polysiloxane spheres, and mixtures thereof.

19. An oil-based wellbore fluid, comprising:
an oleaginous liquid;
a surface-modified precipitated silica, wherein the surface-modified precipitated silica comprises an alkoxyorganomercaptosilane coating; and
an organoclay.

20. The fluid of claim 19, wherein the alkoxyorganomercaptosilane coating is selected from the group consisting of bis(3-(triethoxysilylpropyl) tetrasulfide, bis(3-(triethoxysilylpropyl) disulfide, vinyltrimethoxy silane, vinyltriethoxy silane, 3-mercaptopropyltrimethoxy silane; 3-mercaptopropyltriethoxy silane; 3-aminopropyltriethoxysilane and 3-aminopropyltrimethoxysilane.

* * * * *